(12) United States Patent
Golovchenko et al.

(10) Patent No.: US 8,681,119 B2
(45) Date of Patent: Mar. 25, 2014

(54) ELECTRONIC DEVICE AND TOUCH-SENSITIVE INPUT DEVICE

(75) Inventors: Mykola Golovchenko, Sunnyvale, CA (US); Stanislav Pereverzev, Sunnyvale, CA (US); William Turlay Stacy, Redwood City, CA (US)

(73) Assignee: Blackberry Limited, Waterloo (CA)

( * ) Notice: Subject to any disclaimer, the term of this patent is extended or adjusted under 35 U.S.C. 154(b) by 596 days.

(21) Appl. No.: 12/891,111

(22) Filed: Sep. 27, 2010

(65) Prior Publication Data

US 2012/0075232 A1 Mar. 29, 2012

(51) Int. Cl.
G06F 3/045 (2006.01)
(52) U.S. Cl.
USPC ......................................................... 345/174
(58) Field of Classification Search
None
See application file for complete search history.

(56) References Cited

U.S. PATENT DOCUMENTS

| | | | |
|---|---|---|---|
| 6,147,680 A | 11/2000 | Tareev | |
| 6,535,200 B2 | 3/2003 | Philipp | |
| 6,657,616 B2 | 12/2003 | Sims | |
| 7,129,935 B2 | 10/2006 | Mackey | |
| 2002/0113292 A1 | 8/2002 | Appel | |
| 2004/0256147 A1 | 12/2004 | Shigetaka | |
| 2007/0074914 A1 | 4/2007 | Geaghan et al. | |
| 2007/0228520 A1 | 10/2007 | Winn et al. | |
| 2007/0271399 A1 | 11/2007 | Peng et al. | |
| 2008/0006453 A1 | 1/2008 | Hotelling | |
| 2008/0246496 A1 | 10/2008 | Hristov et al. | |
| 2008/0252608 A1 | 10/2008 | Geaghan | |
| 2009/0122007 A1 | 5/2009 | Tsuzaki et al. | |
| 2009/0159344 A1 | 6/2009 | Hotelling et al. | |
| 2009/0273570 A1 | 11/2009 | Degner et al. | |
| 2009/0322702 A1* | 12/2009 | Chien et al. | 345/174 |
| 2010/0045615 A1* | 2/2010 | Gray et al. | 345/173 |
| 2010/0164901 A1 | 7/2010 | Chen et al. | |
| 2010/0220075 A1 | 9/2010 | Kuo et al. | |

FOREIGN PATENT DOCUMENTS

EP 2065794 A1 6/2009

OTHER PUBLICATIONS

International Search Report and Written Opinion for International Patent Application No. PCT/US2010/051434, dated Sep. 27, 2011, 8 pages.
International Preliminary Report on Patentability dated Apr. 11, 2013, issued in corresponding International Patent Application No. PCT/US2010/051434.

* cited by examiner

*Primary Examiner* — Bipin Shalwala
*Assistant Examiner* — Kwin Xie
(74) *Attorney, Agent, or Firm* — Geoffrey deKleine; Borden Ladner Gervais LLP

(57) ABSTRACT

A touch-sensitive input device includes a first set of conductors and a second set of conductors. The first set of conductors include a first conductor including a plurality of first fingers extending from a first spine, and a second conductor including a plurality of second fingers extending from a second spine, wherein the first fingers are interleaved with the second fingers. The second set of conductors are separated from the first set of conductors by a dielectric material and include a third conductor including a plurality of third fingers extending from a third spine, and a fourth conductor including a plurality of fourth fingers extending from a fourth spine, wherein the third fingers are interleaved with the fourth fingers.

15 Claims, 5 Drawing Sheets

ELECTRONIC DEVICE AND TOUCH-SENSITIVE INPUT DEVICE

FIELD OF TECHNOLOGY

The present disclosure relates to electronic devices including but not limited to portable electronic devices having touch-sensitive displays.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 702.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. Improvements in devices with touch-sensitive displays are desirable.

DETAILED DESCRIPTION

Figure 1:
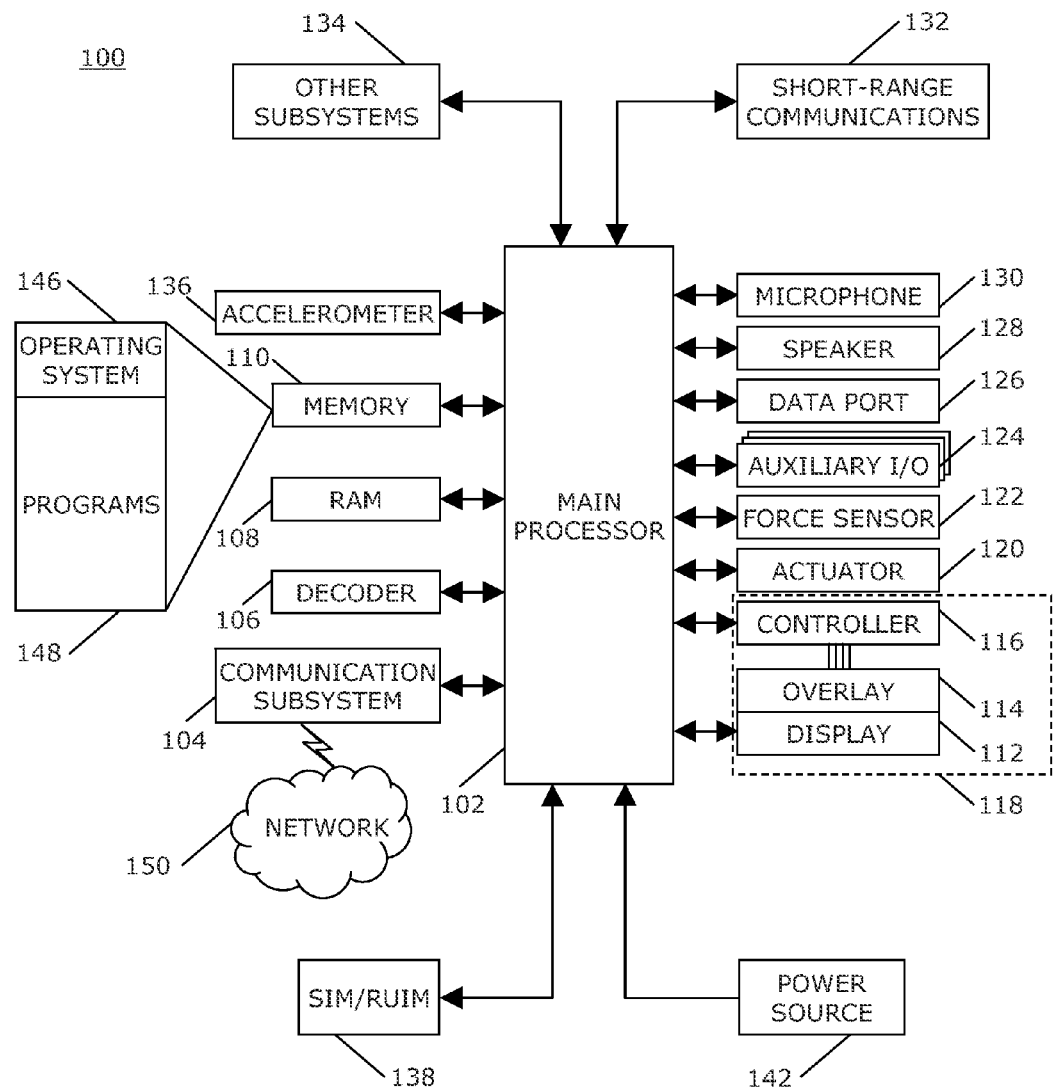
FIG. 1 is a block diagram of a portable electronic device in accordance with the present disclosure.

A touch-sensitive input device includes a first set of conductors and a second set of conductors. The first set of conductors include a first conductor including a plurality of first fingers extending from a first spine, and a second conductor including a plurality of second fingers extending from a second spine, wherein the first fingers are interleaved with the second fingers. The second set of conductors are separated from the first set of conductors by a dielectric material and include a third conductor including a plurality of third fingers extending from a third spine, and a fourth conductor including a plurality of fourth fingers extending from a fourth spine, wherein the third fingers are interleaved with the fourth fingers.

An electronic device includes a display, a first set of conductors disposed on the display, a second set of conductors, and a processor operably coupled to the display, the first set of conductors, and the second set of conductors. The first set of conductors include a first conductor including a plurality of first fingers extending from a first spine, and a second conductor including a plurality of second fingers extending from a second spine, wherein the first fingers are interleaved with the second fingers. The second set of conductors are separated from the first set of conductors by a dielectric material and include a third conductor including a plurality of third fingers extending from a third spine, and a fourth conductor including a plurality of fourth fingers extending from a fourth spine, wherein the third fingers are interleaved with the fourth fingers.

For simplicity and clarity of illustration, reference numerals may be repeated among the figures to indicate corresponding or analogous elements. Similar elements may not separately labeled in the drawings for the sake of simplicity and clarity of the drawings. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably coupled to an electronic controller 116 that together comprise a touch-sensitive display 118, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces. Optionally, the processor 102 may interact with one or more actuators 120 and/or one or more force sensors 122.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

One or more touches, also known as touch contacts or touch events, may be detected by the touch-sensitive display 118. The processor 102 receives touch data, including a location of a touch. A touch may be detected from any suitable object, such as a finger, thumb, appendage or conductive stylus held by a user. The controller 116 and/or the processor 102 may detect a touch by any suitable contact member on the touch-sensitive display 118.

The optional actuator(s) 120, shown in FIG. 1, may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 may result in provision of tactile feedback.

The optional force sensor(s) 122 may provide force information related to a detected touch. The force information may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
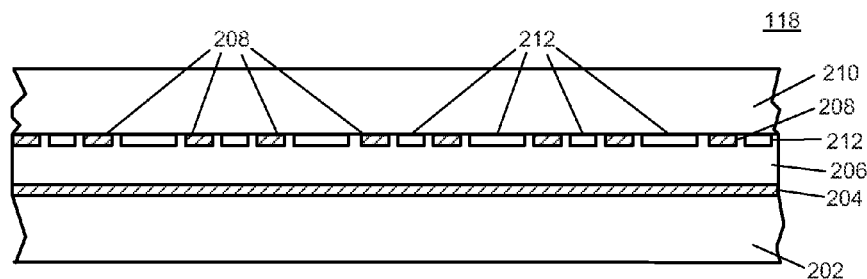
FIG. 2 is a cross-sectional side view of a portion of a touch-sensitive display of the portable electronic device in accordance with the present disclosure.

A cross-sectional side view of a portion of a touch-sensitive display 118 is illustrated in FIG. 2. The touch-sensitive display 118 may be a mutual capacitive touch-sensitive display. A mutual capacitive touch-sensitive display may include a capacitive touch-sensitive overlay 114. The overlay 114 may be an assembly of multiple layers in a stack including, for example, a first substrate 202 below a bottom set of conductors 204 and a second substrate 206 below a top set of conductors 208, and a cover 210. Alternatively, the overlay 114 may comprise a single substrate 206 with the bottom set of conductors 204 deposited on the bottom surface of the substrate 206 and the top set of conductors 208 deposited on the top surface of the substrate 206, and a cover 210. The sets of conductors 204, 208 may be, for example, any transparent, conductive material, such as patterned indium tin oxide (ITO). For the purposes of providing a reference only, the terms below, top, and bottom as utilized herein refer to the position relative to the cover 210 or display 112, e.g., the cover 210 is on top and the display is on the bottom, thus the bottom set of conductors 204 are closer to the display 112 than the top set of conductors 208, which are closer to the cover 210.

The substrates 202 and 206 may be, for example, transparent plates comprised of polyethylene terepthalate (polyester), glass, or other suitable dielectric material. Alternatively, the display 112 may be utilized as a substrate, for example, with the bottom set of conductors 204 deposited onto the display 112 and the first substrate 202 eliminated in this example.

The bottom set of conductors 204 may be applied to the first substrate 202, for example, by depositing the conductor material on the substrate. The substrate 202 may comprise any transparent dielectric material that separates the bottom set of conductors 204 from the top set of conductors 208. The top set of conductors 208 may be deposited on the second substrate 206.

The cover 210 a protective covering and may comprise, for example, a see-through or transparent polymer that may be adhered to the top set of conductors 208, e.g., with a suitable optically clear adhesive. Alternatively the cover may comprise a glass plate that may be adhered to the top set of conductors 208.

Figure 3:
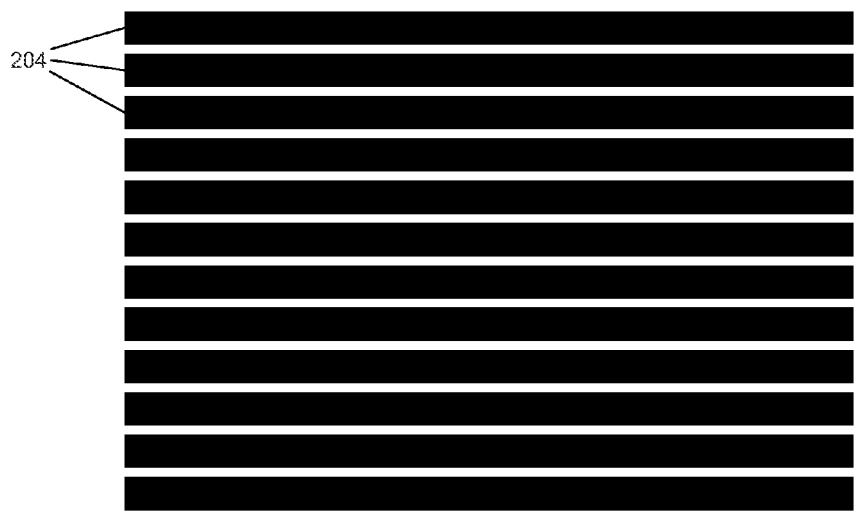
FIG. 3 is a top view of an example of a first set of conductors of a touch-sensitive display in accordance with the disclosure.
Figure 4:
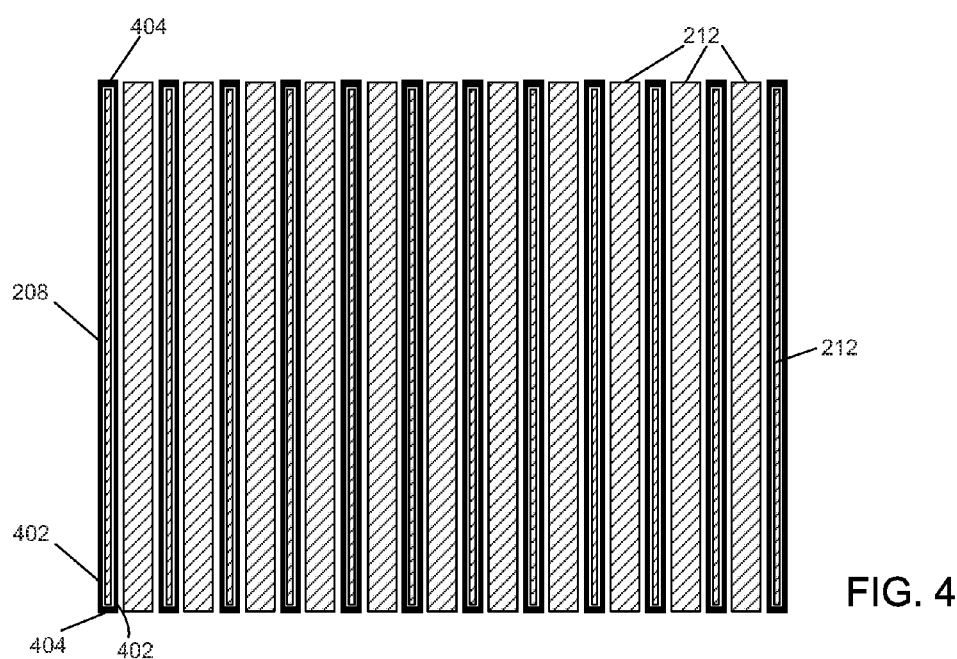
FIG. 4 is a top view of an example of a second set of conductors of a touch-sensitive display.

One example of a bottom set of conductors 204 is shown in FIG. 3, and one example of a top set of conductors 208 is shown in FIG. 4. The conductors 204, 208 are generally transparent and are shown in solid black for the purpose of illustration. The conductors 204, 208 are illustrated in one example, and other suitable numbers of bottom conductors 204 and top conductors 208 may be utilized than are shown. The bottom conductors 204 may be generally parallel bars or lines extending across the display. The top conductors 208 include multiple elongate members 402, also referred to as fingers, that are joined at each end by a spine 404. In the example shown in FIG. 4, the top conductors include two members 402 with a gap separating the two members 402. The members 402 of the top conductors 208 are generally parallel.

The combined width of the members 402 of each top conductor 208 is less than the spacing between the members 402. The total width of each top conductor 208, including the width of the members 402 and the spacing between the members 402, is less than or equal to the width of each bottom conductor 204. The members 402 are small in width by comparison to the width of the bottom conductors 204 to facilitate perturbation or disruption of the electric field between the bottom conductors 204 and the top conductors 208 in response to a touch on or very near the touch-sensitive display 118. The total area of a conductor 208, including the members 402 and the gap between the members 402, is related to the area over which a change in capacitance may be detected.

In the example illustrated in FIG. 2 through FIG. 4, the bottom conductors 204 are utilized as drive lines, also known as transmitters, and the top conductors 208 are utilized as sense lines, also known as receivers. Alternatively, the top conductors 208 may be utilized as drive lines and the bottom conductors 204 may be utilized as sense lines.

In addition to the conductors 204, 208, dummy conductors 212, also referred to as dummy lines, may be utilized, as illustrated in FIG. 2 and FIG. 4. Dummy conductors 212 are conductors that are not utilized as drive lines or sense lines and are electrically isolated from the conductions 204, 208. The dummy conductors 212 may comprise any suitable conductive material such as ITO. The dummy conductors 212 are capacitively coupled to the bottom conductors 204 and are utilized to improve coupling of the bottom conductors 204 to a contact member, such as a finger of a user, when a touch is detected. Dummy conductors 212 may also be utilized to increase uniformity of optical transmission.

The electric field from the top conductors 208 to adjacent dummy conductors 212 extends into the cover 210 in a direction generally perpendicular to the plane in which the cover 210 lies. The distance that the electric field extends from the top conductors 208 is related to the width of the top conductors 208. When the electric field extends past the cover 210, false touch detection may occur when moisture on the cover 210 evaporates. The high dielectric constant of water increases coupling of the top conductors 208 and the bottom conductors 204, increasing mutual capacitance at the droplet location. The decrease in mutual capacitance that occurs when the droplet evaporates may be falsely detected as a touch.

The top conductors 208 with multiple, generally parallel members 402 facilitate touch detection over a wide area while decreased thickness of the members 402 reduces the effect of moisture or droplet evaporation by reducing the distance that the electric field extends in the direction away from the top conductors 208 into the cover 210. Two or more spaced-apart members 402 are utilized for each top conductor 208, rather than a single solid line or bar, and the combined width of these members 402 is less than the width of one of the bottom conductors 204. The electric field may extends into the cover 210, but does not extend through the cover 210, when the width of the each member 402 is narrower. The thickness of the cover 210 is greater than the distance that the electric field extends. This reduction in magnitude of the electric field reduces false touch detection. A contact member, which is conductive and grounded, changes the electric field in response to a touch on the touch-sensitive display 118, thus facilitating touch detection.

Figure 5:
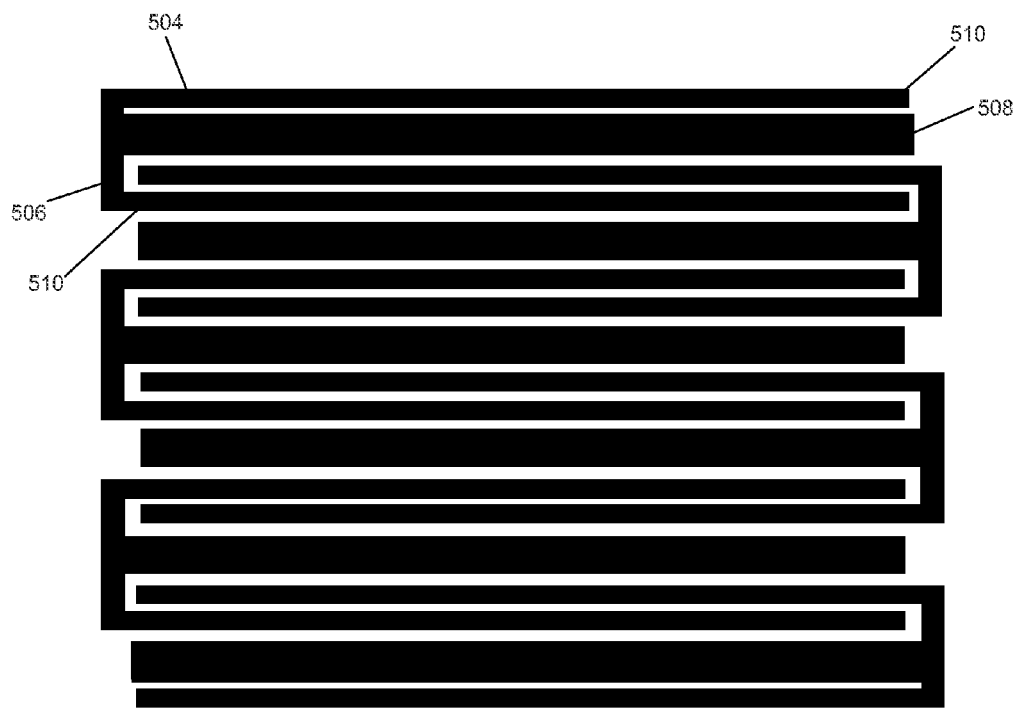
FIG. 5 is a top view of an example of sets of conductors of a touch-sensitive display in accordance with the disclosure.

Another example of the bottom set of conductors 504 of the touch-sensitive display 118 is shown in FIG. 5. The conductors 504 are generally transparent and are shown in black for the purpose of illustration. Although the example of FIG. 5 illustrates six conductors 504, the bottom set of conductors 504 may include, for example, twelve conductors, or any other suitable number of conductors. Each conductor 504 includes a spine 506 and three fingers extending from the spine 506, similar to a comb. The three fingers include a inner finger 508 located between two outer fingers 510. Other numbers of fingers extending from the spine may be utilized.

The conductors 504 are arranged with the spines 506 located on alternating sides of the touch-sensitive display 118. The fingers 508, 510 extend from the spines 506 such that the fingers 508, 510 extending from one spine 506 are interleaved with fingers 508, 510 extending from an adjacent spine. Such interleaving may also be referred to as interdigitation, e.g., as the fingers of a comb are arranged. An outer finger 510 of one conductor 504 is disposed between an outer finger 510 and an inner finger 508 of an adjacent conductor 504. The outer finger 510 of the adjacent conductor 504 is disposed between the outer finger 510 and the inner finger 508 of the one conductor 504. The fingers 508, 510 are separated by gaps such that the fingers 508, 510 of the conductors 504 do not overlap. The outer fingers 508 that are interleaved with fingers 508, 510 of adjacent conductors 504 are spaced from the spines 506 of the adjacent conductors such that conductors 504 do not overlap. The spacing between an outer finger 510 and an inner finger 508 of each of the first and last conductors 504 in the pattern is smaller than the spacing between other outer fingers 510 and inner fingers 508 of the conductors 504 because no interleaving is present, i.e., no outer finger 510 extends between one of the outer fingers 510 and the inner finger 508 of the first and last conductors 504.

The inner finger 508 may be wider than the outer fingers 510 and may be, for example, about twice the width of the outer fingers 510. The gaps between fingers 508, 510 are smaller than the width of the outer fingers 508 such that the conductors 504 cover a majority of the area of the touch-sensitive display 118 to reduce emitted electromagnetic waves from the display 112. For example, the conductors 504 may cover about 95% or more of the surface of the display 112 to shield radio frequency (RF) waves emitted from the display 112. This shielding reduces the electromagnetic interference with the touch-sensitive overlay 114 during touch detection. The use of conductors 504 in a pattern to reduce the emitted electromagnetic waves from the display 112 rather than utilizing a separate shielding layer reduces the number of layers in the overlay 114 and increases light transmission from the display 112.

Figure 6:
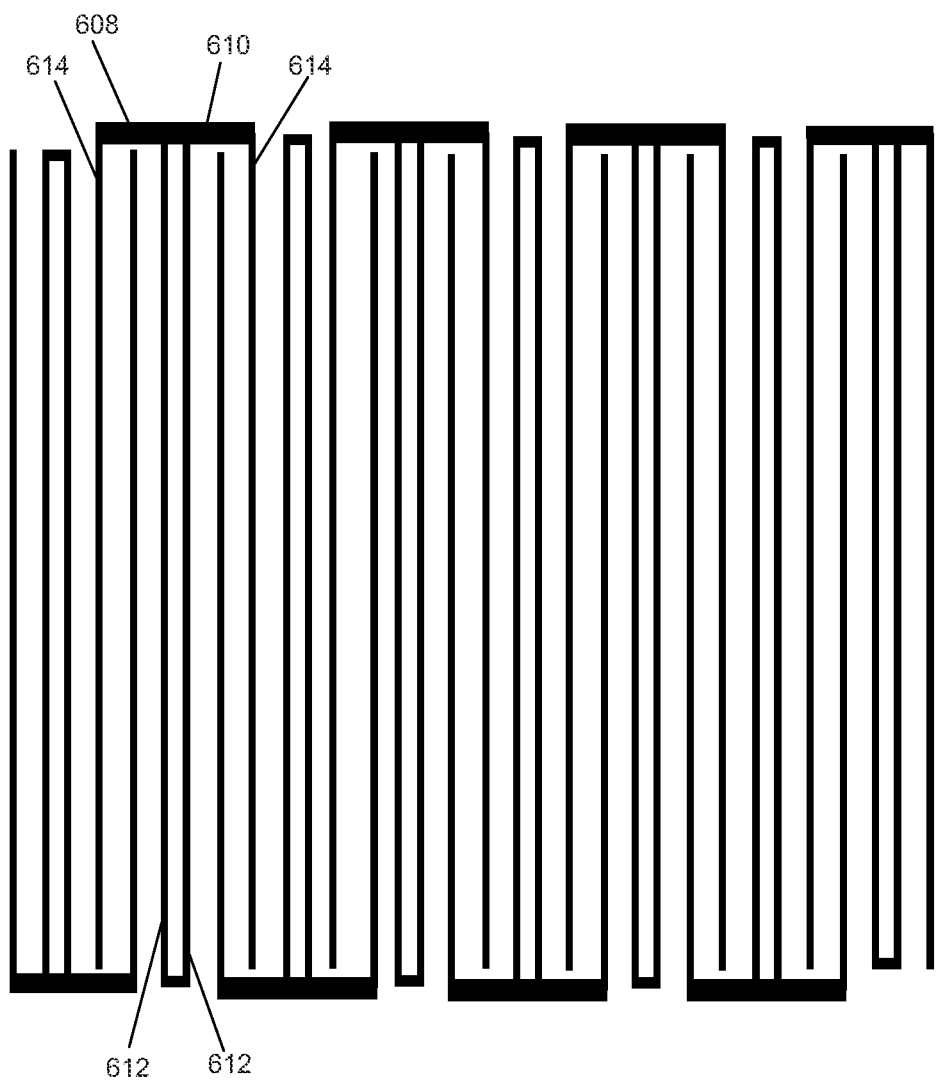
FIG. 6 is a top view of another example of a first set of conductors of a touch-sensitive display in accordance with the disclosure.

An example of the top set of conductors 608 of the touch-sensitive display 118 is shown in FIG. 6. The conductors 608 are generally transparent and are shown in black for the purpose of illustration. Although the example of FIG. 6 illustrates eight conductors 504, the top set of conductors 608 may include, for example, twelve conductors, or any other suitable number of conductors. Each conductor 608 includes a spine 610 and four fingers extending from the spine 610, similar to a comb. The four fingers include two inner fingers 612 located between two outer fingers 614. The two inner fingers 612 are joined by the spine 610 at one end and by a thin band extending between the opposite ends. Other numbers of fingers extending from the spine may be utilized.

The conductors 608 are arranged with the spines 610 located on alternating sides of the touch-sensitive display 118. The fingers 612, 614 extend from the spines 610 such that the fingers 612, 614 extending from one spine 610 are interleaved with fingers 612, 614 extending from an adjacent spine 610. An outer finger 614 of one conductor 608 is disposed between an outer finger 614 and an inner finger 612 of an adjacent conductor 608. The outer finger 614 of the adjacent conductor 608 is disposed between the outer finger 614 and an inner finger 612 of the one conductor 608.

The outer fingers 612 are spaced from the fingers 612, 614 and spines 610 of the adjacent conductors such that conductors 608 do not overlap. The spacing between an outer finger 614 and an inner finger 612 of each of the first and last conductors 608 is smaller than the spacing between other outer fingers 614 and inner fingers 612 of the conductors 608 because no interleaving is present, i.e., no outer finger 614 extends between one of the outer fingers 614 and an inner finger 612 of the first and last conductors 608.

The gaps between fingers 612, 614 are larger than the width of the fingers 612, 614 such that the top conductors 608 cover less area of the display 112 than the bottom conductors 504 to facilitate perturbation or disruption of the electric field between the bottom conductors 504 and the top conductors 608 in response to a touch on the touch-sensitive display 118.

For example, the conductors 608 may cover about 20% or less of the surface of the display 112. Although not shown, dummy conductors may be utilized in the spaces between the conductors 608 to improve coupling of the bottom conductors 504 to the contact member in response to a touch.

Figure 7:
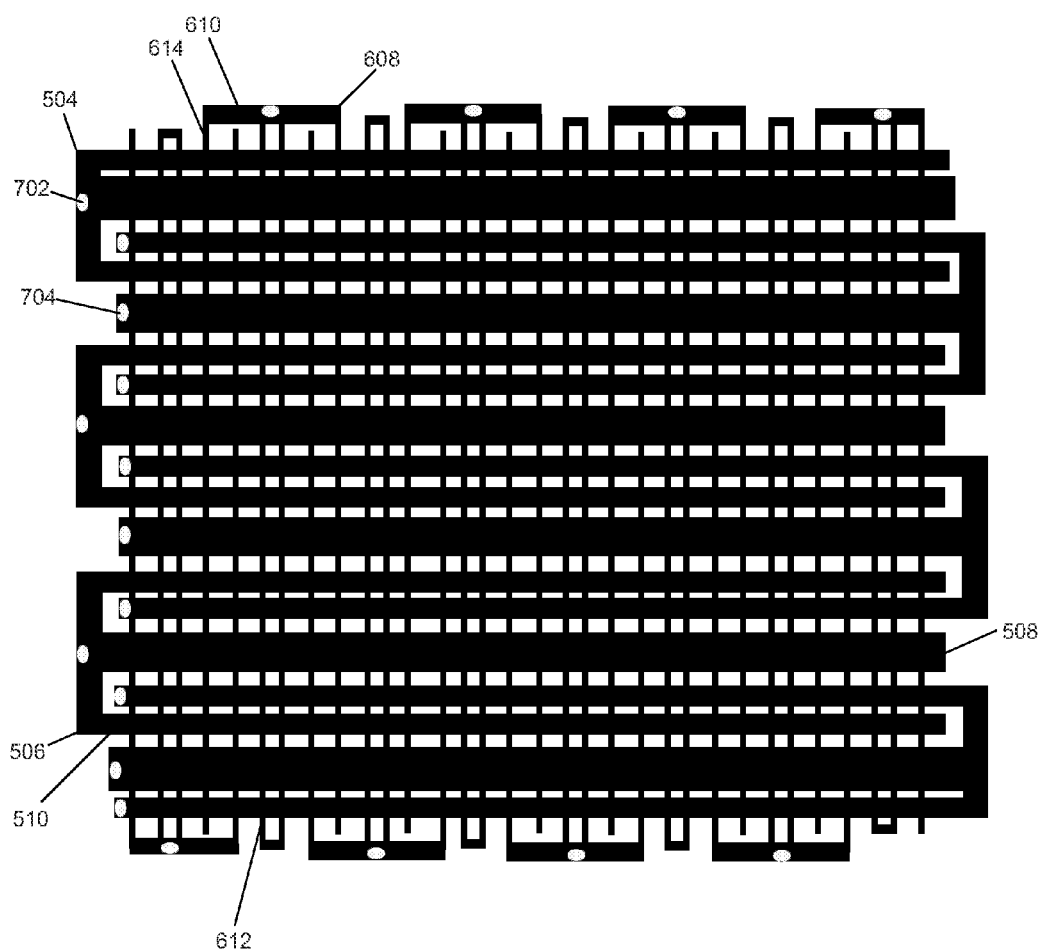
FIG. 7 is a top view of another example of a second set of conductors of a touch-sensitive display.

A top view of the examples of the sets of conductors 504, 608 is shown in FIG. 7. The bottom set of conductors 504 and the top set of conductors 608 are separated by a dielectric material, such as a substrate. The fingers 508, 510 of the bottom conductors 504 extend in a direction that is generally orthogonal, i.e., at a right angle, to the fingers 612, 614 of the top conductors 608 to form a grid. Voltage is applied to one of the sets of conductors 504, 608, also known as the drive lines or transmitters. The other set of conductors 504, 608, also known as sense lines or receivers, is utilized to detect changes in mutual capacitance at nodes. The nodes are the areas where the top conductors 608 pass over the bottom conductors 504, i.e., areas where the top conductors 608 and the bottom conductors 504 have the same x and y coordinates, but not the same z coordinate, e.g., when the conductors 504, 608 are in different planes. Thus, nodes appear to have crossed conductors 504, 608 when viewed in the z-direction. A touch on the touch-sensitive display 118 changes the local electric field and reduces the mutual capacitance between the top conductors 608 and the bottom conductors 504 at the nodes. The change in capacitance may be measured to determine the touch location. In the example shown, the drive lines are the bottom set of conductors and the sense lines are the top set of conductors. Alternatively, the bottom set of conductors may be utilized as sense lines and the top set of conductors utilized as drive lines.

Capacitance changes when a touch is detected compared to when a touch is not detected. The magnitude of this change in capacitance at a node location is related to the distance between the touch and the node. This change in capacitance is greatest when the touch is located directly over the node. Utilizing interleaved conductors 504, 608, a single top conductor 608 crosses over a single bottom conductor 504 at multiple points, increasing the effective size of the node at which the single top conductor 608 crosses over the single bottom conductor 504.

The conductors 504, 608 are electrically coupled to the controller 116. Both the top conductors 608 and bottom conductors 504 shown in FIG. 5 may be electrically coupled to the controller 116 utilizing a printed flexible circuit. Typically routing traces, e.g., conductive metal traces are utilized to couple the sensor conductors to bonding pads on one side of the overlay. In the case of a single substrate with conductors 504 on the bottom surface and conductors 608 on the top surface, bonding pads may be utilized on one end of the conductors 504. The flexible printed circuit is configured such that contact may be made to bonding pads 702 on the spines 506 and bonding pads 704 on the ends of the fingers 508, 510.

A low total resistance in each of the conductors 504, 608 is desirable. Increased resistance results in increased time delays that slow the responsiveness of detection of a touch. The electrical resistance of the conductors 504, 608 from the touch point to the connection point along the conductor is reduced utilizing the connection points illustrated with reference to FIG. 5. Connecting to the spine of a conductor may reduce resistance in response to a touch. Electrical connection to a conductor 504 or 608 may be made to all three fingers in parallel, which may be implemented, for example, by connecting either to the spine or to each of the fingers separately and connecting the fingers together on the flexible printed circuit.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A touch-sensitive input device comprising:
   a first set of conductors comprising a first conductor including a first finger, a second finger, and third finger extending from a first spine and a second conductor including a fourth finger, a fifth finger, and a sixth finger extending from a second spine, wherein the first finger, the second finger and third finger are interleaved with the fourth finger, the fifth finger, and the sixth finger;
   a second set of conductors separated from the first set of conductors by a dielectric material and comprising a third conductor including a seventh finger, an eighth finger, and a ninth finger extending from a third spine and a fourth conductor including a tenth finger, an eleventh finger, and a twelfth finger extending from a fourth spine, wherein the seventh finger, the eighth finger, and the ninth finger are interleaved with the tenth finger, the eleventh finger, and the twelfth finger;
   a first bonding pad disposed on the first spine to electrically couple the first conductor to a first conductive trace;
   a second bonding pad disposed on the fourth finger, a third bonding pad disposed on the fifth finger, and a fourth bonding pad disposed on the sixth finger to electrically couple the second conductor to a second conductive trace.

2. The touch-sensitive input device according to claim 1, wherein the touch-sensitive input device comprises a touch-sensitive display and the first set of conductors are disposed over an area of the display to substantially shield radio frequency signals from a display of the touch-sensitive display.

3. The touch-sensitive input device according to claim 1, wherein the touch-sensitive input device comprises a touch-sensitive display and the first set of conductors are disposed over a majority of a display of the touch-sensitive display to substantially shield radio frequency signals from the display.

4. The touch-sensitive input device according to claim 1, wherein spaces between the first fingers and the second fingers are small compared to the width of the fingers.

5. The touch-sensitive input device according to claim 1, wherein the spaces between the third fingers and the fourth fingers are larger than the spaces between the first fingers and the second fingers.

6. The touch-sensitive input device according to claim 1, wherein the touch-sensitive input device comprises a touch-sensitive display and wherein spaces between the fingers of the first conductor and the fingers of the second conductor are small compared to the width of the fingers of the first conductor to facilitate shielding of electrical signals from a display.

7. The touch-sensitive input device according to claim 1, comprising a display, wherein the dielectric material is disposed on the display.

8. The touch-sensitive input device according to claim 1, wherein the touch-sensitive input device comprises a touch-sensitive display and the dielectric material comprises a part of a display.

9. The touch-sensitive input device according to claim 1, wherein the first set of conductors comprises further conductors.

10. The touch-sensitive input device according to claim 1, wherein the second set of conductors comprises further conductors.

11. The touch-sensitive input device according to claim 1, comprising:
   a fifth bonding pad disposed on the third spine to electrically coupled the third conductor to a third conductive trace;
   a plurality of a sixth bonding pad disposed on the tenth finger, a seventh bonding pad disposed on the eleventh finger, and an eighth bonding pad disposed on the twelfth finger to electrically couple the fourth conductor to a fourth conductive trace.

12. An electronic device comprising:
   a display;
   a first set of conductors disposed on the display and comprising:
      a first conductor including a plurality of first fingers extending from a first spine located on a first side of the touch-sensitive input device;
      a second conductor including a plurality of second fingers extending from a second spine located on a second side of the touch-sensitive input device, wherein the second side is opposite the first side;
      a first bonding pad disposed on the first spine to electrically couple the first conductor to a first conductive trace;
      a plurality of second bonding pads disposed on the plurality of second fingers to electrically couple the second conductor to a second conductive trace;
      wherein the first fingers extend towards the second side and the second fingers extend toward the first side such that the first fingers are interleaved with the second fingers;
   a second set of conductors separated from the first set of conductors by a dielectric material and comprising:
      a third conductor including a plurality of third fingers extending from a third spine located on a third side of the touch-sensitive input device and
      a fourth conductor including a plurality of fourth fingers extending from a fourth spine located on a fourth side of the touch-sensitive input device, wherein the fourth side is opposite the third side,
      wherein the third fingers extend towards the fourth side and the fourth fingers extend toward the third side such that the third fingers are interleaved with the fourth fingers;
   a processor operably coupled to the display, the first set of conductors, and the second set of conductors.

13. The electronic device according to claim 12, wherein the width of the first and second fingers is greater than the width of the third and fourth fingers.

14. The electronic device according to claim 12, wherein the first fingers and the second fingers are generally parallel.

15. The electronic device according to claim 12, wherein the third fingers and the fourth fingers are generally parallel.

* * * * *